US007719712B2

(12) United States Patent
Eaton

(10) Patent No.: US 7,719,712 B2
(45) Date of Patent: May 18, 2010

(54) VARIABLE DRIVE FOR PRINTHEAD

(75) Inventor: William S. Eaton, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1958 days.

(21) Appl. No.: 10/670,061

(22) Filed: Sep. 24, 2003

(65) Prior Publication Data

US 2005/0062804 A1 Mar. 24, 2005

(51) Int. Cl.
*G06F 15/00* (2006.01)
*B41J 2/05* (2006.01)

(52) U.S. Cl. .......................................... 358/1.8; 347/57

(58) Field of Classification Search .................. 358/1.1, 358/1.4, 1.7, 1.8, 1.9; 347/5, 9, 10, 12, 14, 347/19, 48, 57

See application file for complete search history.

(56) References Cited

U.S. PATENT DOCUMENTS 5,053,790 A 10/1991 Stephenson et al.
5,677,577 A 10/1997 Barbehenn et al.
5,920,331 A 7/1999 Silverbrook
6,318,828 B1 * 11/2001 Barbour et al. ................ 347/9
6,334,660 B1 * 1/2002 Holstun et al. ................ 347/19
6,409,298 B1 * 6/2002 Ahne et al. .................. 347/14
6,565,176 B2 5/2003 Anderson et al.
6,755,495 B2 * 6/2004 Beck et al. .................... 347/12
2002/0145639 A1 10/2002 Masuda et al.

FOREIGN PATENT DOCUMENTS

EP 0318328 5/1989
EP 1241006 9/2002
WO PCT/US2004/029919 9/2004

* cited by examiner

*Primary Examiner*—Gabriel I Garcia

(57) ABSTRACT

A driver for driving simultaneously a variable number of firing resistors for a printhead includes a drive circuit for supplying a drive signal for firing the variable number of firing resistors, and a circuit for adjusting a voltage or current magnitude of the drive signal in dependence on the variable number of firing resistors to be fired simultaneously.

10 Claims, 6 Drawing Sheets

FIG. 1
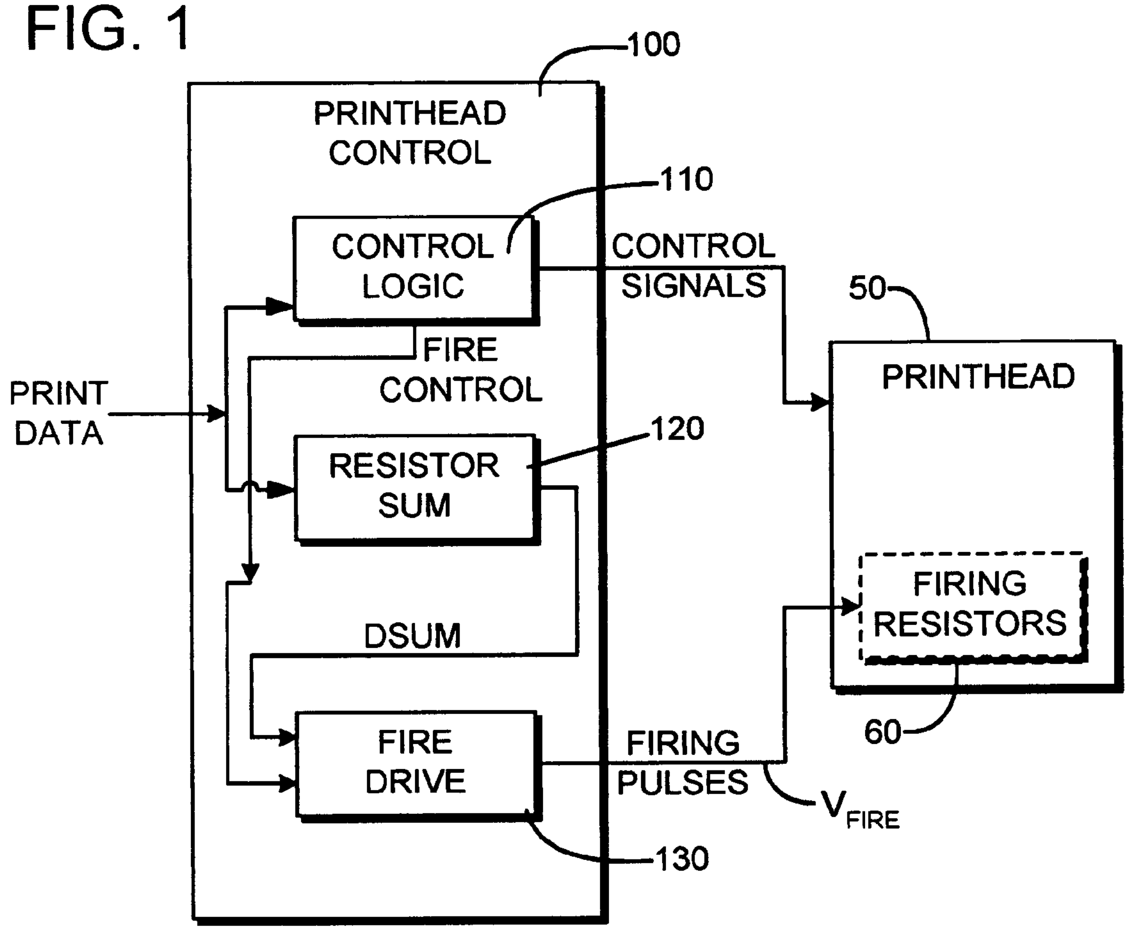
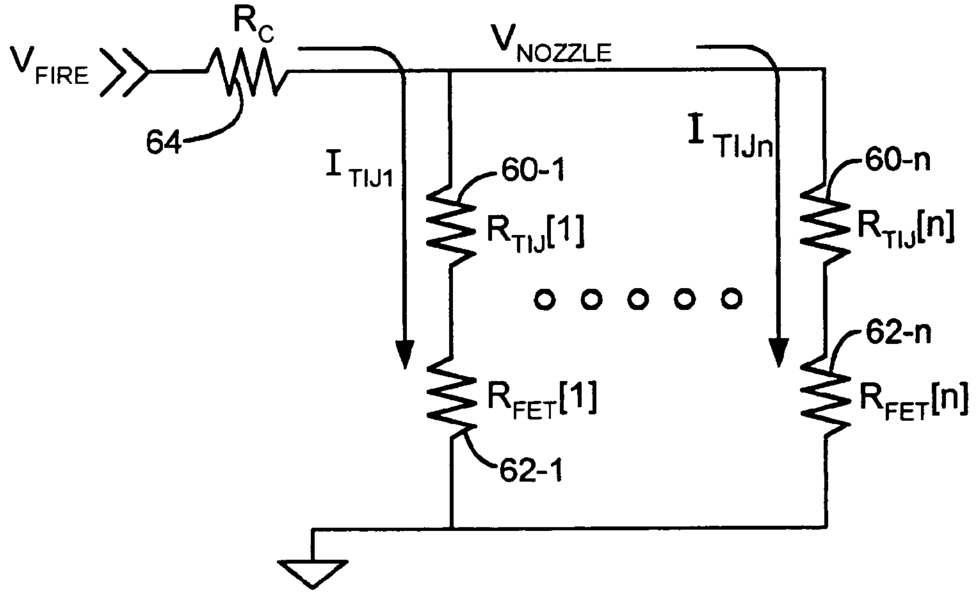
FIG. 2

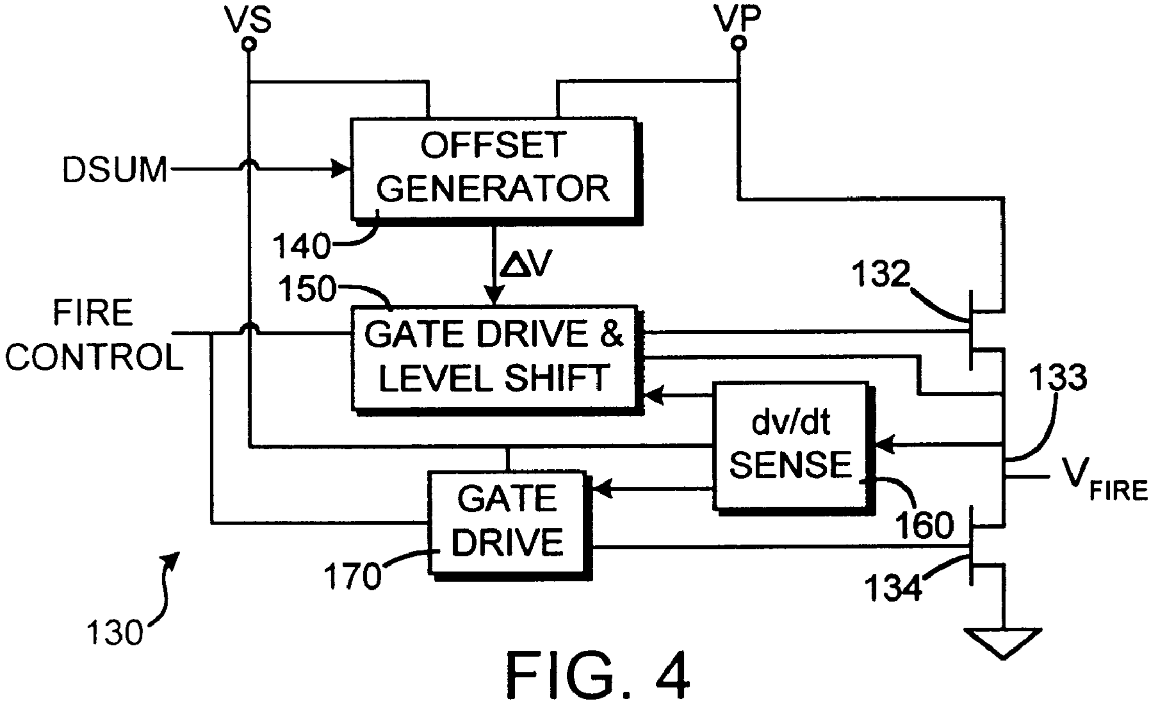
FIG. 4
FIG. 5
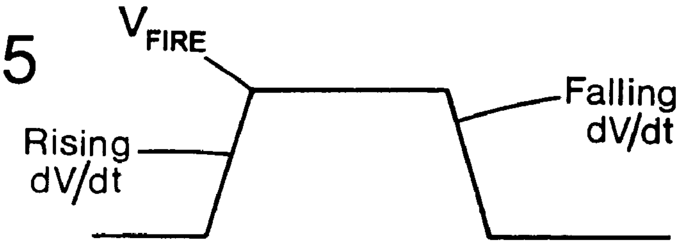

| DSUM | FIXED OFFSET | DSUM OFFSET | ΔV |
|---|---|---|---|
| 0 | 1.0 | 0 | VP - 1.0 |
| 1 | 1.0 | 1.5 | VP - 2.5 |
| 2 | 1.0 | 1.3 | VP - 2.3 |
| 3 | 1.0 | 1.1 | VP - 2.1 |
| 4 | 1.0 | 0.9 | VP - 1.9 |
| 5 | 1.0 | 0.6 | VP - 1.6 |
| 6 | 1.0 | 0.4 | VP - 1.4 |
| 7 | 1.0 | 0.2 | VP - 1.2 |
| 8 | 1.0 | 0 | VP - 1 |

VARIABLE DRIVE FOR PRINTHEAD

BACKGROUND OF THE DISCLOSURE

Thermal inkjet printheads employ drop ejectors which include firing resistors to vaporize fluid in firing chambers, resulting in droplet ejection through nozzles respectively associated with the firing chambers. There has been a trend toward increasing the number of firing chambers and associated resistors on the printhead, leading to increased complexity in driving the firing resistors. In the past, multiple drivers have typically been used to apply the firing signals to different groups of firing resistors. Firing only one resistor at a time by a given driver reduces or prevents energy variation error terms that may occur due to parasitic effects, but at the expense of increased interconnection complexity and performance. For these and other reasons, there is a need for the present invention.

SUMMARY OF THE DISCLOSURE

A driver for driving simultaneously a variable number of firing resistors for a printhead includes a drive circuit for supplying a drive signal for firing the variable number of firing resistors, and a circuit for adjusting a magnitude of a voltage or current of the drive signal in dependence on the variable number of firing resistors to be fired simultaneously.

BRIEF DESCRIPTION OF THE DRAWINGS

Features and advantages of the disclosure will readily be appreciated by persons skilled in the art from the following detailed description when read in conjunction with the drawing wherein:

FIG. 1 is a simplified schematic block diagram illustrating an embodiment according to the present invention of a printhead and a printhead controller.

FIG. 2 is a simplified printhead circuit.

FIG. 4 is a simplified schematic diagram illustrating an embodiment according to the present invention of a fire driver circuit for the printhead controller circuit of FIG. 1.

FIG. 5 is a graphical illustration of an exemplary firing pulse as a function of time.

DETAILED DESCRIPTION OF THE DISCLOSURE

Figure 3:
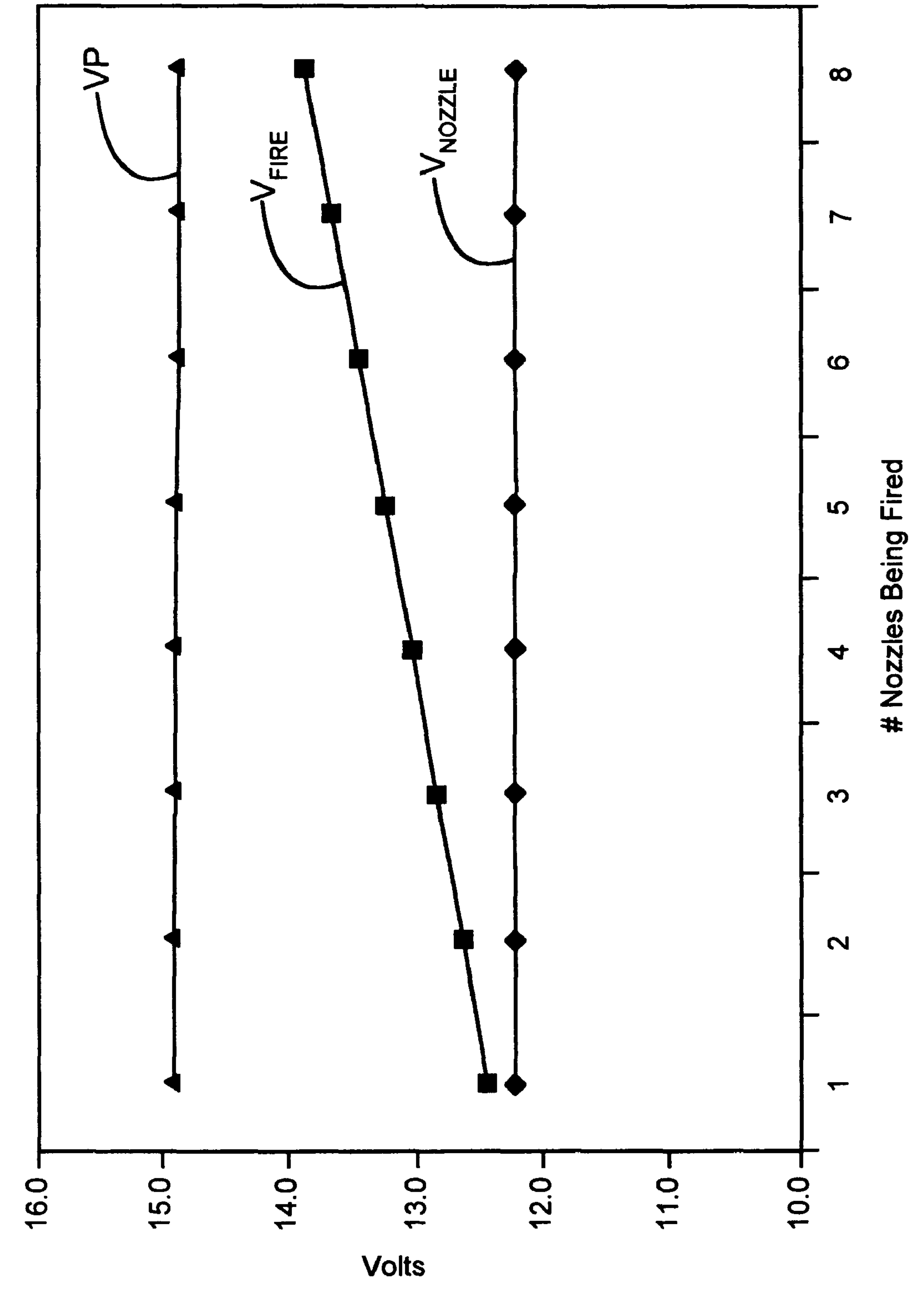
FIG. 3 is a graphical illustration of an embodiment according to the present invention of a fire signal voltage applied as a function of a number of printhead resistors to be fired.

In the following detailed description and in the several figures of the drawing, like elements are identified with like reference numerals.

An embodiment of a printhead firing arrangement is illustrated in simplified form in FIG. 1. An inkjet printhead 50 has a set of firing resistors 60 which are energized to fire droplets of fluid, e.g. ink, from respective firing chambers through respective nozzles, as is known in the art. The printhead 50 in this exemplary embodiment receives a set of control signals and a set of firing pulses from a printhead control 100. The control signals select the particular resistors to be fired during a firing cycle, and the firing pulses are applied to the resistors selected to be fired.

In this exemplary embodiment, the control signals and the firing pulses are provided by a printhead control circuit 100. The circuit 100 receives the print data which identify the firing pattern for successive firing cycles. This data is converted by control logic 110 into the control signals which are provided to the printhead, and fire control signals provided to a fire drive circuit 130. The print data is also applied to a resistor sum circuit or nozzle counter 120. It is contemplated that a plurality of fire drive circuits may be employed to drive corresponding subsets, typically called "primitives," of the firing resistors. For example, each subset of firing resistors driven by a fire drive circuit may comprise eight firing resistors in one embodiment, sixteen firing resistors in another embodiment, and sixty four firing resistors in yet another embodiment. The particular number of fire drive circuits for a given control circuit 100 will depend on the particular printhead, i.e the number of firing resistors on the printhead, as well as other application-specific parameters. Each fire circuit has an associated resistor sum or counter circuit to determine the number of resistors to be fired in the particular subset during the firing cycle.

The resistor sum circuit 120 analyzes the print data for a firing cycle to determine how many resistors of the resistors which can be driven by the fire circuit 130 will be fired during the cycle. In an exemplary embodiment, the circuit 120 is implemented as a bit wise adder. The circuit 120 generates a signal DSUM whose value is indicative of that number of resistors. For example, if the number of resistors which can be driven by the fire circuit 130 is eight, then the DSUM signal value could indicate from 0 resistors to a maximum of 8 resistors for a given firing cycle. The following table describes exemplary outputs for an embodiment wherein the primitive size is eight nozzles.

DSUM Output Decoding

| Input #Resistors to be fired | Output DSUM |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |

The exemplary fire circuit 130 receives the fire control signals from the control logic 110 and the DSUM signal from resistor sum 120, and generates a fire pulse during the firing cycle whose voltage magnitude is dependent on the firing data, and particularly varies as a function of the DSUM signal. In an exemplary embodiment, the magnitude of the fire pulse voltage is proportional to the number of resistors to be fired during the cycle, and particularly monotonically increases as the number of resistors to be fired increases.

Consider the simplified exemplary printhead circuit model shown in FIG. 2. The printhead firing voltage $V_{fire}$ is applied to the printhead firing resistors 60-1 . . . 60-*n* through a parasitic resistance 64, a common mode error resistance $R_c$. Each of the firing resistors is in series with an FET switch whose resistance is depicted as respective resistances 62-1 . . . 62-*n*. The states of the FET switches are controlled by the printhead control signals applied to the printhead. The common mode error resistance acts as a voltage divider with the parallel combination of the firing resistances and FET resistances. The voltage applied to each firing-FET resistor leg, $V_{nozzle}$, varies based on the number of nozzles being fired, causing the delivered current $I_1 \ldots I_n$, and thus the energy to each fired nozzle to vary. This variation is due to the voltage divider effect resulting from the common mode resistance.

To compensate for this variation in energy, the magnitude of the firing voltage $V_{fire}$ is varied in dependence on the number of nozzles being fired during a given firing cycle. FIG. 3 graphically illustrates this variation as a function of the number of nozzles fired for an exemplary embodiment. $V_{fire}$ increases monotonically as the number of nozzles being fired increases, such that the voltage applied to each nozzle $V_{nozzle}$ remains substantially constant. VP is the supply voltage for the fire drive circuit, and also is constant.

In another embodiment, a current characteristic of the resistor drive signal can be controlled in dependence on the number of nozzles being fired in a given firing cycle, instead of a voltage characteristic as described above. In such an alternate embodiment, the magnitude of the current $I_{fire}$ is increased as the number of nozzles being fired simultaneously during the cycle increased.

An embodiment of a fire drive circuit 130 is schematically shown in FIG. 4. At the output side of the circuit are two FET transistors 132, 134 connected in series between a voltage node VP and ground. The fire voltage $V_{fire}$ is developed at node 133 between the two FETs, at a variable offset voltage below VP. The variable offset voltage is set by an offset generator 140, which sets the offset voltage value ΔV in dependence on the value DSUM, i.e. the number of resistors to be fired during a given firing cycle. The gate drive on FET 132 is set by a gate drive and level shift circuit 150, in response to the firing data, the value ΔV, and a signal from a dv/dt sense circuit 160. The gate drive on FET 134 is set by a gate drive circuit 170, in response to the fire control signal and the signal from circuit 160.

The gate drive circuit 150 functions to set the fire voltage pulse maximum value to the offset voltage level set by the offset generator 140, by setting an appropriate drive on the high side FET 132, and also provide proper pulse turn on shaping. FIG. 5 illustrates an exemplary fire voltage pulse, with the gate drive circuit 150 setting the ramp up to the voltage set by the offset generator. The dV/dt sense circuit 160 functions to control the ramp up characteristic, and, with the gate drive circuit 170 and FET 134, to pull down the voltage at the node 133 at the end of the pulse, in response to the fire control signal from circuit 110 (FIG. 1). Thus, the circuit 160 sets the ramp down slope at the end of the firing pulse.

Figures 6, 6A:
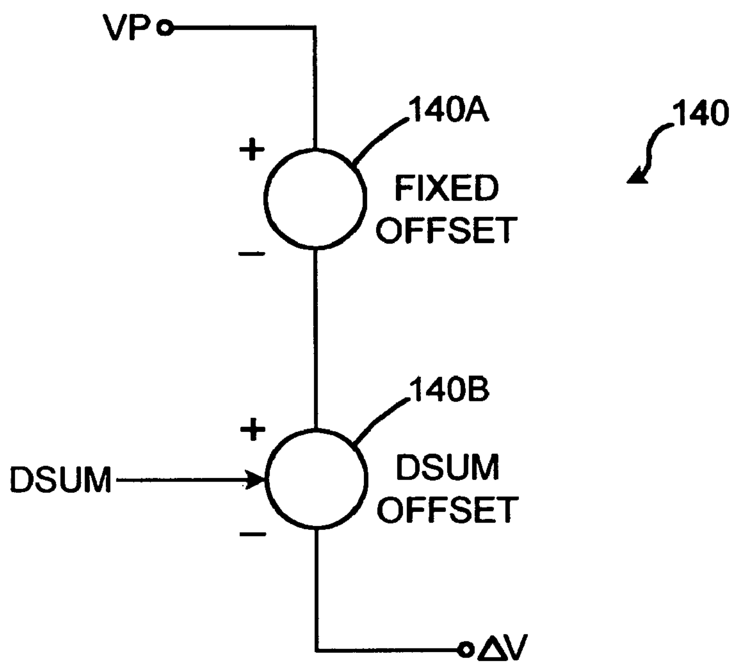
FIG. 6 is a functional block diagram of an embodiment according to the present invention of an offset generator comprising the exemplary circuit of FIG. 4.
FIG. 6A is a table of exemplary offset voltages.

FIG. 6 is a functional block diagram of the programmable offset generator 140. There is a fixed offset voltage provided by fixed offset 140A, and a data variable offset voltage (DSUM offset) provided by a variable offset 140B which is dependent on DSUM. FIG. 6A shows a table of exemplary offset voltages from VP, for a case wherein the fire drive circuit fires up to eight nozzles, wherein the offset voltages are rounded to the nearest 0.1 volt. The fixed offset is 1.0 volt for this example. In this embodiment, the output of the offset generator 140 is a voltage value ΔV=VP-Fixed Offset Voltage–DSUM offset voltage.

Figure 7:
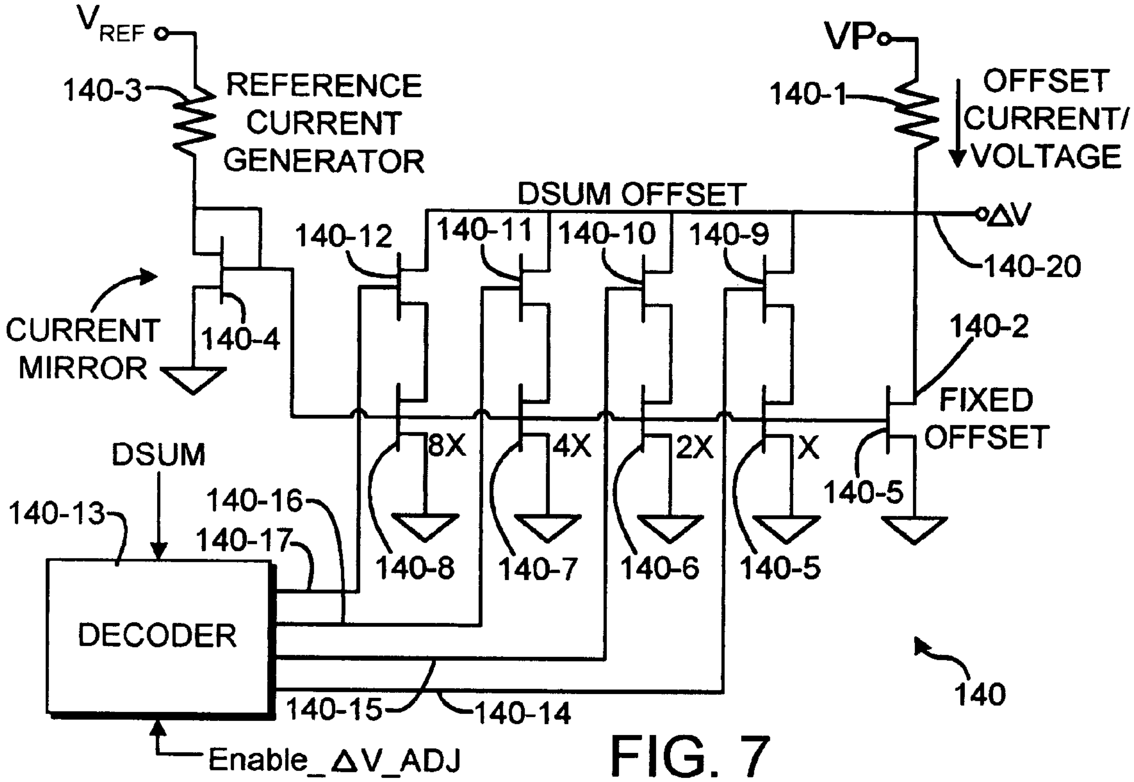
FIG. 7 is a schematic of an exemplary circuit according to the present invention for implementing an offset generator comprising the circuit of FIG. 4.

FIG. 7 is a schematic of an exemplary circuit for implementing the offset generator 140. Other circuit arrangements could alternatively be employed. The circuit of FIG. 7 implements a digital to analog conversion function, converting a digital value (DSUM) into a corresponding voltage. The circuit 140 includes a resistor 140-1 and an FET 140-2 connected in series between voltage VP and ground. A current mirror circuit comprising a temperature stabilized reference voltage $V_{REF}$, with a resistor 140-3 and an FET 140-4 connected in series between the reference voltage and ground. The reference current drives the gates of transistors 140-2, 140-5, 140-6, 140-7 and 140-8. The sizes of the junctions of FETS 140-5 to 140-8 differ, with transistor 140-5 having a size x, 140-6 a size 2x, 140-7*a* size 4x and 140-8 a size 8x. Thus, transistor 140-6 conducts twice the current of 140-5 in the on state, transistor 140-7 four times the current of 140-5 in the on state, and transistor 140-8 eight times the current of 140-5 in the on state. The output of the circuit 140 is taken at node 140-20. Each of transistors 140-5 to 140-8 is connected between ground to node 140-20 through a corresponding transistor switch 140-9 to 140-12. The gates of each transistor switch are driven by an output of decoder 140-13, which decodes DSUM when enabled by an enable signal (ENABLE_ΔV_ADJ) into corresponding on or off states at outputs 140-14 to 140-17. The decoder outputs turn on selected ones of the switches 140-9 to 140-12 in dependence on the value of DSUM, which in turn connects node 140-20 to current mirrors through the corresponding FETs 140-5 to 140-8. This will increase the current drawn through resistor 140-1 and the corresponding offset voltage, ΔV.

Figure 8:
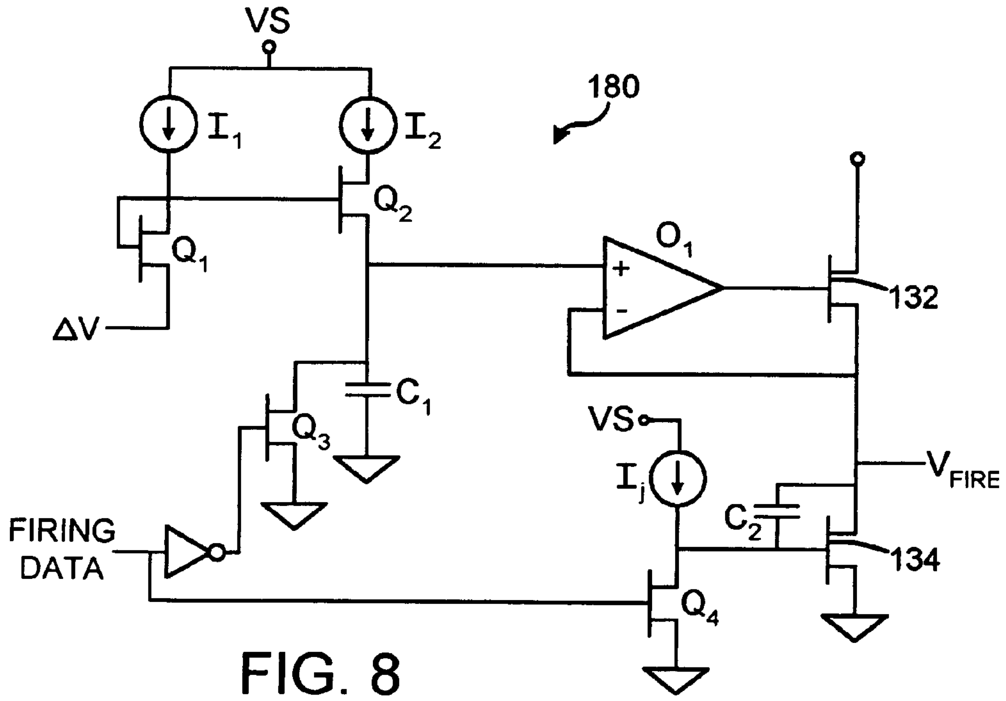
FIG. 8 is a schematic circuit diagram of an exemplary circuit according to the present invention for implementing functions of the gate drive and level shift circuit, the dv/dt sense circuit and the gate drive circuit comprising the circuit of FIG. 4.

FIG. 8 is a schematic circuit diagram of an exemplary circuit 180 for implementing functions of the gate drive and level shift circuit 150, the dv/dt sense circuit 160 and the gate drive circuit 170 of FIG. 4. In this circuit arrangement, transistors Q1 and Q2 are connected to transfer the offset voltage ΔV to an input of the driver operational amplifier $O_1$. Capacitor C1 and current I1 control the rising edge dV/dt of the firing pulse. Current I3 and capacitor C2 control the falling edge dV/dt. The amplifier O1 actively controls the gate of FET 132 to deliver the desired output voltage (ΔV) and dV/dt characteristic. FET Q3 turns on/off the high state driver 132, in response to the firing data. FET Q4 turns on/off the low side driver 134 in response to the firing data. Other circuit arrangements could alternatively be employed.

Figure 9:
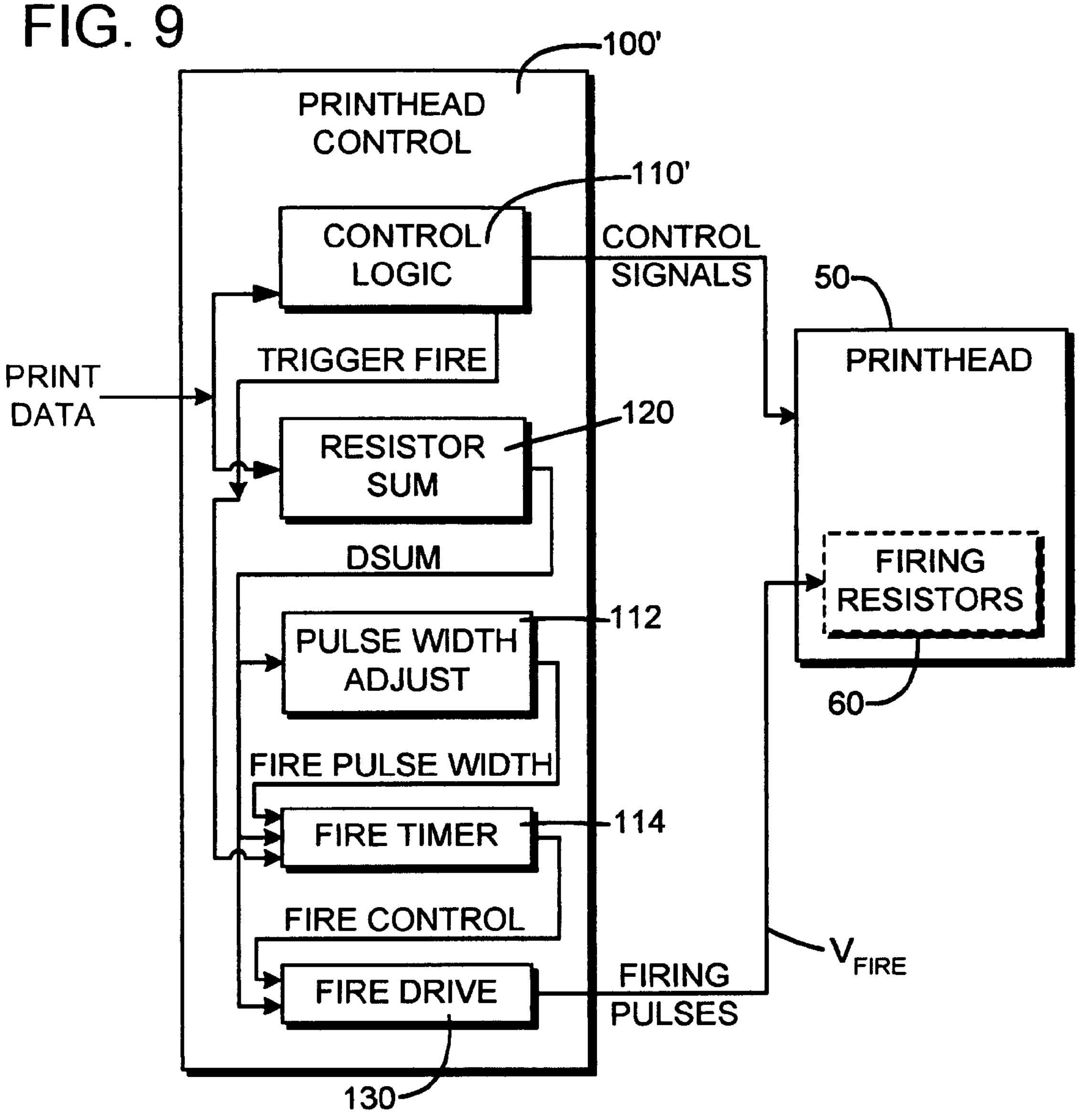
FIG. 9 is a simplified schematic block diagram illustrating an alternate embodiment according to the present invention of a printhead and a printhead controller.

In another embodiment, the pulse width of the firing pulse is dependent on the number of nozzles being fired, as described in U.S. Pat. No. 5,677,577, as well as the magnitude of the firing voltage $V_{fire}$. FIG. 9 illustrates an embodiment of a printhead control 100' which drives the printhead with firing pulses of variable pulse width and variable voltage. In this case, the control logic 110' is responsive to the print data, and generates a "trigger fire" signal to initiate the start of a printhead firing cycle, as well as the control signals for the printhead. As in the embodiment of printhead control 100 (FIG. 1), the print data is also applied to the resistor sum circuit 120. The resistor sum circuit 120 analyzes the print data for a firing cycle to determine how many resistors of the resistors which can be driven by the fire circuit 130 will be fired during the cycle.

The printhead control 100' further includes a pulse width adjust circuit function 112, and a fire timer circuit 114. The pulse width adjust circuit 112 converts the DSUM signal into a fire pulse width signal which determines the width of the firing pulses to be provided to the printhead by the fire drive circuit 130. The circuit 112 can in an exemplary embodiment provide a look up table conversion function, whereby the DSUM signal value provides an address for a corresponding fire pulse width value. In general, the more resistors are fired in a given firing cycle, the longer the pulse width.

The fire timer circuit 114 is responsive to the trigger fire signal and the fire pulse width signal to generate the fire control signal to the fire drive circuit 130. Thus, the start of the firing pulses is triggered by the control logic 110', and the length of the pulses is set by the fire timer 114. In an exemplary embodiment, the fire timer circuit 114 can include a state machine, although other implementations can alternatively be employed.

The exemplary fire circuit 130 receives the trigger fire signals from the control logic 110 and the DSUM signal from resistor sum 120, and generates a fire pulse during the firing cycle whose voltage magnitude and pulse width are dependent on the firing data, and particularly vary as a function of the DSUM signal. In an exemplary embodiment, the magnitude of the fire pulse voltage is proportional to the number of resistors to be fired during the cycle, and particularly monotonically increases as the number of resistors to be fired increases. The pulse width monotonically increases as the number of resistors to be fired increases.

The embodiment of FIG. 9 allows flexibility in the magnitude of the variable firing voltage and the pulse width maximum. By using both variables in an exemplary embodiment, the maximum firing voltage and pulse width can be reduced, in comparison to embodiments in which only variable pulse width or firing voltage is employed.

Although the foregoing has been a description and illustration of specific embodiments of the invention, various modifications and changes thereto can be made by persons skilled in the art without departing from the scope and spirit of the invention as defined by the following claims.

What is claimed is:

1. A driver circuit for driving simultaneously a variable number of firing resistors for a printhead during a printing firing cycle, the driver circuit comprising:

a drive circuit for supplying firing pulses for firing the variable number of firing resistors during the printing firing cycle, the driver circuit being a voltage source supplying a voltage of a drive signal encompassing the firing pulses, the voltage having a predetermined magnitude;

a circuit for adjusting the predetermined magnitude of the voltage of said drive signal during the printing firing cycle in dependence on the variable number of firing resistors to be fired simultaneously in a given subset during the printing firing cycle, wherein the circuit applies a data variable offset voltage dependent on the variable number of firing resistors, and a fixed offset voltage not dependent on the variable number of firing resistors.

2. The driver circuit of claim 1, wherein said circuit adjusts the predetermined magnitude of the voltage in dependence on said variable number of firing resistors being simultaneously fired.

3. The driver circuit of claim 2, wherein said circuit provides an increased voltage magnitude for larger variable numbers.

4. The driver circuit of claim 1, wherein said fixed offset voltage is inversely proportional to the variable number of firing resistors.

5. The driver circuit of claim 1, wherein said fixed offset voltage is a monotonically increasing function of said variable number of firing resistors.

6. A driver circuit for driving simultaneously a variable number of firing resistors for a printhead, the driver circuit comprising:

a drive circuit for supplying a drive signal for firing the variable number of firing resistors during a printing firing cycle, the drive circuit including a voltage source providing a voltage of the drive signal, the voltage having a predetermined magnitude;

means for adjusting the predetermined magnitude of the voltage of said drive signal during the printing firing cycle in dependence on the variable number of firing resistors to be fired simultaneously in a given subset during the printing firing cycle, wherein said adjusting means comprises circuit means for providing a data variable offset voltage dependent on said variable number of firing resistors and a fixed offset voltage not dependent on said variable number of firing resistors.

7. The driver circuit of claim 6, wherein said adjusting means comprises means for adjusting the predetermined magnitude of the voltage in dependence on said variable number of firing resistors being simultaneously fired.

8. The driver circuit of claim 7, wherein said adjusting means provides an increased voltage magnitude for larger variable numbers.

9. The driver circuit of claim 6, wherein said offset voltage is inversely proportional to the variable number of firing resistors.

10. The driver circuit of claim 6, wherein said magnitude is a monotonically increasing function of said variable number of firing resistors.

* * * * *